United States Patent [19]

Wood et al.

[11] 4,439,687
[45] Mar. 27, 1984

[54] GENERATOR SYNCHRONIZATION IN POWER RECOVERY UNITS

[75] Inventors: Charles E. Wood, Schaumburg; Ronald J. Vangelisti, Marseilles, both of Ill.

[73] Assignee: UOP Inc., Des Plaines, Ill.

[21] Appl. No.: 396,569

[22] Filed: Jul. 9, 1982

[51] Int. Cl.$^3$ ............................................... H02P 9/04
[52] U.S. Cl. ................................. 290/40 R; 290/40 A; 290/40 B; 60/667; 60/677; 60/678
[58] Field of Search .................. 290/4 D, 10, 22, 25, 290/31, 34, 40 A, 40 B, 40 C, 40 R; 60/677, 678, 676, 679, 667

[56] References Cited

U.S. PATENT DOCUMENTS

| | | | |
|---|---|---|---|
| 2,540,691 | 2/1951 | Reese et al. | 60/677 X |
| 3,247,129 | 4/1966 | Roelofsen et al. | 252/417 |
| 3,277,651 | 10/1966 | Augsburger | 60/677 X |
| 3,401,124 | 9/1968 | Goulden | 252/417 |
| 3,427,464 | 2/1969 | Watson | 290/40 R |
| 3,777,486 | 12/1973 | Damratowski | 60/105 |
| 3,855,788 | 12/1974 | Damratowski | 60/39.03 |
| 3,882,680 | 5/1975 | Durrant et al. | 60/677 X |
| 3,999,787 | 12/1976 | Park | 290/40 R |
| 4,015,430 | 4/1977 | Braytenbah et al. | 60/679 X |
| 4,060,990 | 12/1977 | Guido et al. | 60/676 |
| 4,103,178 | 7/1978 | Yannone et al. | 290/40 R |
| 4,118,635 | 10/1978 | Barrett et al. | 290/40 R |
| 4,132,076 | 1/1979 | Weiss | 290/40 A X |
| 4,188,792 | 2/1980 | Schaible | 60/660 |
| 4,338,788 | 7/1982 | Fink | 60/676 X |

Primary Examiner—G. Z. Rubinson
Assistant Examiner—Paul Shik-Luen Ip
Attorney, Agent, or Firm—James R. Hoatson, Jr.; Richard J. Cordovano; William H. Page, II

[57] ABSTRACT

There is disclosed a method and a control system for synchronizing the frequency of electrical current produced by a generator with the frequency of electrical current in an electric power grid so that the output of the generator can be provided to the grid. The generator is driven by an expansion turbine which utilizes hot pressurized gas from a process in which the pressure must be maintained constant.

16 Claims, 1 Drawing Figure

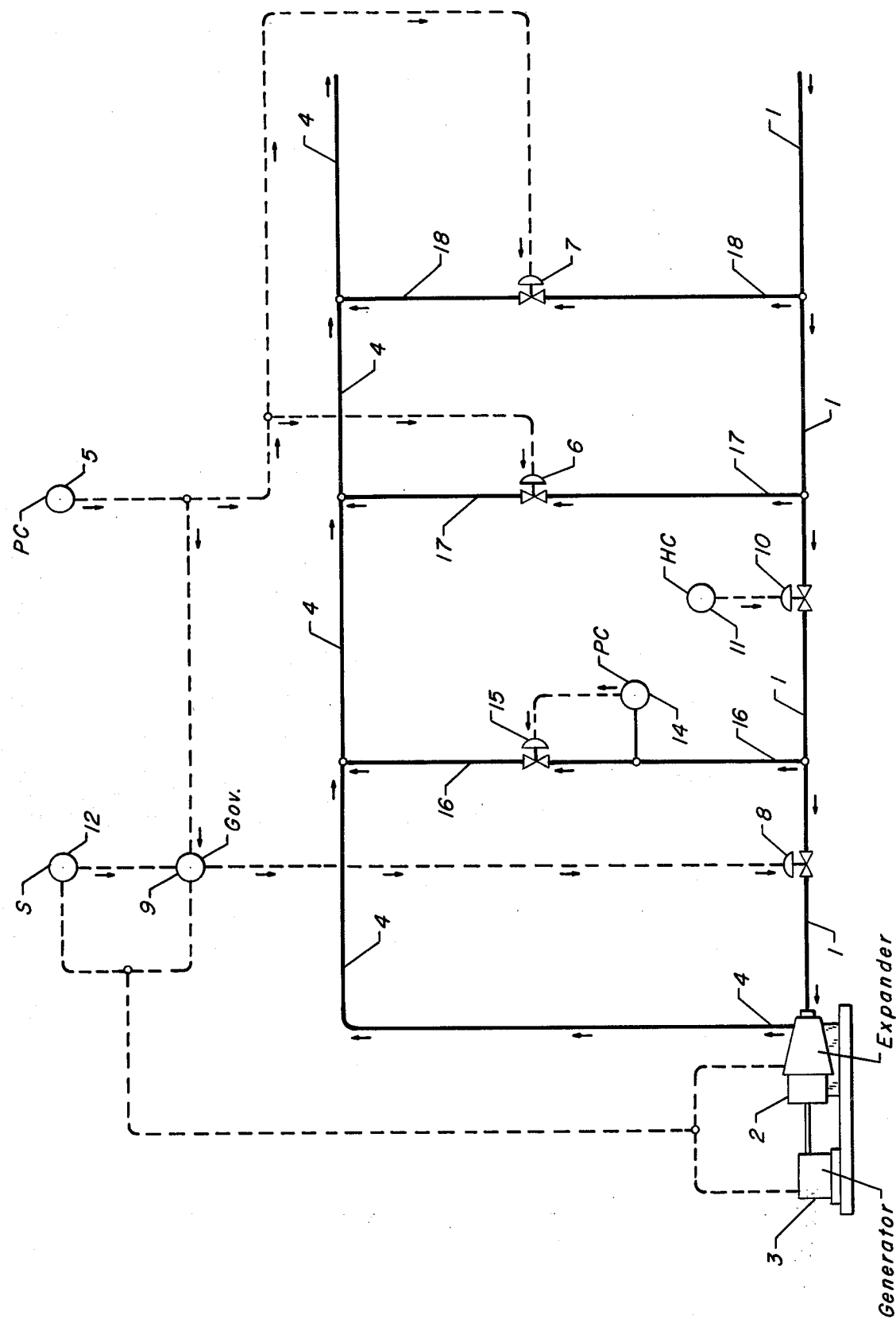

GENERATOR SYNCHRONIZATION IN POWER RECOVERY UNITS

BACKGROUND OF THE INVENTION

In many industrial processes, hot gases under pressure are produced. These gases, usually consisting primarily of air or air depleted in oxygen, are often vented to the atmosphere after passage through pollution control equipment, such as scrubbers, resulting in the waste of the energy contained therein. It is becoming common to recover energy from such gases by expanding the gas through a gas expansion engine in the form of an expansion turbine, denoted an expander. The expander is used to drive equipment such as air compressors and electric power generators. This invention relates to a method for synchronizing a generator driven by an expander to an electric power grid so that the output of the generator can be supplied to the grid. An electric power grid consists of numerous electricity producers and numerous electricity users, all connected by a common network of electrical power transmission lines.

This invention is especially adapted for use with an expander used to recover energy contained in flue gas from a regenerator used in the fluid catalytic cracking of hydrocarbons. Hydrocarbon feed and catalyst are introduced into a reactor in which the cracking reactions take place to produce hydrocarbon products. As a result of the reactions, the catalyst acquires a coating of carbonaceous matter, usually referred to as coke, which interferes with the effectiveness of the catalyst. The normal procedure in a fluid catalytic cracking plant is to continously withdraw catalyst, treat it to remove coke, and return it to the reactor. Treatment is accomplished by subjecting the catalyst to a high temperature environment in a pressure vessel called a regenerator. The high temperature environment is comprised of air serving as a fluidizing medium for the catalyst and as a source of oxygen for combustion of the accumulated surface deposits (coke). Catalyst is removed from the regenerator gas before the gas passes through the expander, usually by cyclone separating means within the regenerator.

When an expander is utilized to drive a generator, the speed of the generator is directly dependent on expander speed until the generator is connected to a grid. In order to connect a generator to a grid, the frequency of the electrical current produced by the generator must match the frequency of the electrical current flowing in the grid within about plus or minus 0.25 Hz. Because frequency is directly dependent on speed, the expander must be operated in a relatively narrow speed range, about 25 RPM wide. Since the pipeline supplying gas to an expander and the control valve controlling gas flow in that pipeline is normally quite large, on the order of four feet or more in diameter, it is difficult to attain a sufficiently precise expander speed during start-up. That the pressure upstream of the expander control valve may be variable adds to the difficulty. Due to hysteresis, inertia, and worn and sticky components, the smallest increment of movement of a large valve may produce a change in expander speed that is larger than 25 RPM. In the example of a fluid catalytic cracking prdcess, pressure in the regenerator during expander start-up is controlled by adjustment of a control valve almost as large as the expander control valve and subject to the same precision difficulties. Thus, as process conditions vary and the regenerator pressure control valve responds in an attempt to maintain regenerator pressure at a pre-set value, there are fluctuations at the expander valve inlet which usually result in a change in flow through the expander. The instant invention provides a method and apparatus to control expander speed precisely, so that a generator driven by it can be connected to a grid.

U.S. Pat. Nos. 3,401,124 (Goulden) and 3,247,129 (Roelofsen) may be consulted for more background on the use of expanders with fluid catalytic cracking processes. In both, a steam generator is used to recover energy from the gas stream additional to that recovered by use of an expander. Roelofsen shows use of an expander to drive an air compressor which provides air to the regenerator and a valve 51 which is analogous to pressure control valve 6 of the instant Drawing. In normal operation, both valves open further to vent excess regenerator pressure and close further when pressure falls. An additional effect in the case of Roelofsen valve 51 is that its movement also affects regenerator pressure by changing air compressor speed. Goulden shows use of an expander to drive an air compressor and a motor-generator, but does not address the problem of frequency synchronization before connecting the generator to the plant power system. The arrangement of valves which includes valves 64, 64', and 65 in Goulden appears to be similar to valves 6 and 7 of the instant Drawing. There is a bypass line around the expander in Goulden to which flow is switched by a three-way valve; there is no pressure control loop associated with this line.

In U.S. Pat. Nos. 3,855,788 and 3,777,486, Damratowski shows an expander driving a generator and air compressor and utilizing the feature of two large control valves as mentioned above. There is also shown a steam turbine connected to the expander, generator, and air compressor, referred to as a starting steam turbine. Though not mentioned by Damratowski, such a steam turbine would normally be equipped with sufficiently precise speed controls so that it can be used in starting up the generator and adjusting its output frequency to match a grid. Damratowski also shows a relatively small bypass line containing a control valve, which is similar to that employed in the instant invention. However, that line starts downstream of the expander control valve rather than upstream as in the instant invention and is used for the purpose of preventing an overspeed trip rather than to sychronize speeds during start-up as in the instant invention. Further, the hand control valve of the instant invention is not shown. U.S. Pat. No. 4,188,792 (Schaible) may be consulted for additional background on regulation of turbines, in that case steam-driven turbines.

BRIEF SUMMARY OF THE INVENTION

It is an object of this invention to provide a method of synchronizing the frequency of electrical current produced in a generator to the frequency of electrical current in an electric power grid during start-up of a generator-expander set, so that the output of the generator can be provided to the grid, where pressurized hot gas from a process in which the operating pressure must be maintained constant is used to drive the expander. In one of its broad embodiments, the present invention consists of (a) controlling pressure in a first pipeline supplying a first portion of the gas to the expander at a point upstream of an expander control valve and downstream of a second control valve by adjusting the position of the second control valve and by varying the flow of a second portion of the gas through a first bypass pipeline bypassing the expander; (b) monitoring the frequency of electrical current produced by the generator; (c) comparing the generator frequency to the frequency of electrical current flowing in the grid; (d) adjusting the flow of the first portion of gas through the first pipeline to the expander so that the generator frequency is acceptably equal to the grid frequency; and, (e) connecting the electrical power output of the generator to the grid.

In a more specific embodiment, the present invention consists of the steps of (a) adjusting the setpoint of an automatic first bypass pressure controller, which adjusts a first bypass pressure control valve located in a first bypass pipeline bypassing the expander and which senses pressure upstream of the pressure control valve, to a value less than the operating pressure of the regenerator; (b) opening a hand control valve located in the pipeline feeding the expander upstream of the first bypass pipeline connection point to the extent necessary to cause the first bypass pressure control valve to be almost fully open; (c) opening an expander control valve located in the pipeline feeding the expander downstream of the first bypass line connection point to the extent necessary to raise the generator frequency to a value just below the grid frequency; (d) adjusting the first bypass pressure controller setpoint and hand control valve position to obtain the best regulation from the expander control valve; (e) using a synchronizer to control the expander control valve and connect the generator to the grid upon attaining the proper frequency; and, (f) increasing gas flow to the expander and placing controls in the normal operating mode.

Another embodiment of the invention may be broadly characterized as a control system for use in a power recovery system wherein a portion of pressurized gas from a process is employed to drive an expander which mechanically drives a generator, wherein the generator provides electrical power to a grid, wherein it is necessary to maintain constant the pressure at which the process operates; such control system useful in starting operation of the expander and comprising; (a) an expander control valve located upstream of the expander in the first pipeline feeding a first portion of the gas to the expander; (b) a first pressure control means comprising a first bypass pipeline having a control valve, said first bypass pipeline communicating with the first pipeline upstream of the expander control valve; (c) a second control valve located in the first pipeline upstream of the point at which the first bypass pipeline is joined to the first pipeline; and, (d) a second pressure control means comprising a controller and two expander bypass pipelines, with each expander bypass pipeline having a control valve and communicating with the first pipeline upstream of the second control valve. In this embodiment, the second pressure control means controls the pressure at which the process operates and the expander control valve is operatively connected to receive a control signal from an electrical governor. As shown in the Drawing, the electrical governor is operatively connected to receive a control signal from a synchronizer.

Other objects and embodiments will become apparent upon consideration of this entire specification.

BRIEF DESCRIPTION OF THE DRAWING

The Drawing depicts an embodiment of the invention used with a typical fluid catalytic cracking unit regenerator, described above. It shows a generator and expander with the expander feed and exhaust lines and the pressure control system. Only those elements necessary to a clear understanding of the invention are shown in the Drawing, the other elements necessary to a complete system being well within the knowledge of those skilled in the art. The use of the example as presented in the Drawing is not intended as a limitation on the broad scope of the invention as set forth in the claims. In the Drawing, dashed lines represent transmission of control signals to and from items of control hardware.

DETAILED DESCRIPTION OF THE INVENTION

The invention can best be understood by reference to the Drawing, which represents a schematic example of a particular application of the invention.

During operation, gas flows out of a regenerator (not shown) to expander 2 by means of pipeline 1, which is referred to herein as the first pipeline. Generator 3 is mechanically coupled to and driven by expander 2. Electrical power produced in generator 3 is supplied to a grid. After giving up a portion of its energy in expander 2, the gas stream leaves the expander by means of pipeline 4 and flows to apparatus for further processing (not shown), if required, and then to apparatus for dispersing it in the atmosphere (not shown). Pressure controller 5, which is a conventional automatic controller, receives a signal representative of pressure in the regenerator by a means not shown and adjusts pressure control valves 6 and 7 and expander valve 8 in order to maintain regenerator pressure at a predetermined value. Valves 6 and 7 allow gas to bypass the expander through pipelines 17 and 18 while valve 8 controls gas flow to the expander. The valves are sized and the system is arranged so that at normal operating conditions, valve 8 will pass 90% of the normal gas flow from the regenerator, valve 6 will pass 10% of the normal gas flow so that 10% will bypass the expander, and valve 7 will be closed. However, valve 7 is capable of passing 100% of normal gas flow, thus allowing gas to bypass the expander completely. Split range control is used; if gas flow decreases from normal, valve 6 closes further to maintain pressure and when it is completely closed, valve 8 begins to close if flow continues to derease. If gas flow increases from normal, valve 6 opens further and when it is completely open, valve 7 starts to open if flow continues to increase.

The control signal from pressure controller 5 to expander valve 8 is subject to the operation of a low signal selector contained in electric governor 9. Expander valve 8 is configured for purposes of control and allows gas to leak through it even when it is fully closed. Hand control valve 10 is provided for the purposes of use in the practice of the invention and to accomplish tight shut-off and complete isolation of expander 2. The position of valve 10 is set by adjusting hand control station 11, which is a conventional manual loading station.

Electric governor 9 is a sophisticated control and safety device familiar to those skilled in the art. Only a few of its features need be discussed herein in order to aid in an understanding of this example of the practice of the invention. Note also that the features of a governor vary in accordance with the application in which it is used. One feature is a valve ramp command, by which expander valve 8 can be opened or closed. This is essentially a conventional manual loading station. Another feature is the speed controller, in which a desired speed is set and an output signal generated to adjust the position of valve 8. The speed controller is similar in operation to a standard automatic controller. The last feature of interest is the low signal selector mentioned above. The primary input signals to the low signal selector are the valve 8 control signal produced by the speed controller, the ramp command, and pressure controller 5 output. The low signal selector sends the smallest in magnitude of its three input signals to valve 8.

Synchronizer 12 is a device familiar to those skilled in the art and used only during start-up, which generates a signal for use in adjusting the speed of generator 3, based on the inputs supplied to it. These inputs are desired frequency of the current produced by generator 3 and the actual frequency. During synchronization of the generator, the output signal from synchronizer 12 varies the flow of gas to expander 2 by adjusting the position of expander valve 8; to increase expander speed, the valve is opened more fully in order to increase gas flow. Pipeline 16 is a path for gas to bypass expander 2 and is located close to the expander. Bypass pressure controller 14 senses pressure in pipeline 16 and adjusts pressure control valve 15 so as to maintain a value preset at pressure controller 14. The bypass is sized so that a relatively small quantity of gas flows through it.

Before the expander is started up, the fluid catalytic cracking unit, including the regenerator, is placed in operation. Since the expander is not operating, all gas is bypassing it, flowing through pressure control valves 6 and 7. Hand control valve 10 is closed at this time. The first step in starting the expander is to place bypass pressure controller 14 in automatic mode and adjust the setpoint to an appropriate value less than the operating pressure of the regenerator, as controlled by pressure controller 5. Since there is no pressure at the sensing point of pressure controller 14, pressure control valve 15 will be fully closed. Hand control valve 10 should then be slowly opened to the point that valve 15 is almost fully open. As gas flows through valve 10, pressure controller 14 senses an increase in pressure above its setpoint and opens valve 15.

While and after complying with the appropriate procedures for warming-up expander 2, expander valve 8 is slowly opened by means of the ramp command feature of electric governor 9. As valve 8 is opened, hand control station 11 is used to adjust valve 10 so that bypass valve 15 remains in a controllable range. The signal from the ramp command is then raised to its maximum. The speed controller in governor 9 has a control range of 50 to 100% of rated speed and its setpoint should be set at 50%. Initially, the ramp command signal will be the lowest of those going to the low signal selector of governor 9. Since expander-generator speed is lower than 50%, the signal from the speed controller will be at a maximum. Valve 8 is configured such that a control signal of low magnitude closes the valve and an increasing control signal opens the valve. Valves 6 and 7 are configured in the same manner. Since valves 6 and 7 are open to pass almost all of the gas from the regenerator, the control signal to valve 8 from pressure controller 5 is at a maximun. As the ramp command signal is increased to call for a speed above 50%, the speed controller output will become the lowest signal and will be communicated to valve 8, replacing the ramp command signal. The speed controller setpoint is now raised to increase the speed of the generator to a value slightly below the synchronous speed, i.e., the speed at which its frequency matches that of the grid. The setpoint of bypass pressure controller 14 and the position of hand control valve 10 are adjusted to obtain the most precise regulation from expander valve 8. Then synchronizer 12 is activated to adjust valve 8 to attain the proper generator speed. When generator frequency closely matches grid frequency, synchronizer 12 will signal a circuit breaker to close, thus supplying generator output to the grid. At this point a contact opens to remove synchronizer 12 from the system and control of expander valve 8 reverts to the speed controller.

After connection to the grid, changes in gas flow to the expander by means of valve 8 no longer change the speed of the expander but instead affect the quantity of power which the generator produces. Thus precise speed control is no longer critical. At this point in the start-up sequence, the generator produces only a small amount of power because valve 10 is only partially open, restricting gas flow to the expander and gas is bypassing the expander through pipelines 16, 17 and 18. Also at this point, an object of the invention has been accomplished. Valve 10 reduced the pressure upstream of valve 8, thus allowing valve 8 to more finely control gas flow, in that a given increment of valve travel produced a smaller change in gas flow and thus speed. The use of the pressure controller 14-pressure control valve 15 loop held the pressure upstream of expander valve 8 constant, thus removing a significant barrier to the accomplishment of synchronization by means of synchronizer 12. With a fluctuating upstream pressure, synchronizer 12 would have to respond to that and might not be capable of controlling speed sufficiently closely for grid connection to take place. Note that since valve 15 is considerably smaller than expander valve 8 and pressure control valve 7, it is capable of much more precise control.

Returning to the start-up sequence, it is necessary to increase the power output of the generator and place the controls in the normal operating mode. The flow through pipeline 16 is stopped by increasing the setpoint of pressure controller 14 to its maximum, thereby closing valve 15. The pipeline 16 flow is simply switched to pipelines 17 and 18 by doing this. Valve 10 is adjusted to the full open position. Then the ramp command feature of governor 9 is adjusted to the point where its output is lower than that of the speed controller, which is raised to a predetermined maximum value. The ramp command function is then used to open expander valve 8 to its full open position. As expander valve 8 opens, pressure controller 5 closes pressure control valve 7. Ramp command output is left at its maximum and any change in regenerator pressure will then cause pressure controller 5 to adjust valves 6, 7, and 8 as explained above.

We claim as our invention:

1. In a system for recovering power by utilizing pressurized gas from a process, wherein a portion of the gas is employed to drive an expander which mechanically drives a generator, wherein the generator provides electrical power to a grid, wherein it is necessary to maintain constant the pressure at which the process operates; a method of synchronizing the frequency of electrical current produced by the generator to the frequency of electrical current in the grid, comprising the steps of:

(a) controlling pressure in a first pipeline supplying a first portion of the gas to the expander at a point upstream of an expander control valve and downstream of a second control valve by adjusting the position of said second control valve and by varying the flow of a second portion of the gas through a first bypass pipeline bypassing the expander;
(b) monitoring the frequency of electrical current produced by the generator;
(c) comparing the generator frequency to the frequency of electrical current flowing in the grid;
(d) adjusting the flow of said first portion of gas through the first pipeline to the expander so that the generator frequency is acceptably equal to the grid frequency; and,
(e) connecting the electrical power output of the generator to the grid.

2. The method of claim 1 wherein said process is fluid catalytic cracking of hydrocarbons.

3. In a system for recovering power by utilizing pressurized gas from a process, wherein a portion of the gas is employed to drive an expander which mechanically drives a generator, wherein the generator provides electrical power to a grid, wherein it is necessary to maintain constant the pressure at which the process operates; a control system for synchronizing the frequency of electrical current produced by the generator to the frequency of electrical current in the grid, comprising:
(a) an expander control valve located in a first pipeline supplying a first portion of the gas to the expander;
(b) means for controlling pressure in the first pipeline at a point upstream of said expander control valve and downstream of a second control valve by use of said second control valve and by varying the flow of a second portion of the gas through a first bypass pipeline, which bypasses said expander;
(c) means for monitoring the frequency of electrical current produced by the generator;
(d) means for comparing the generator frequency to the frequency of electrical current flowing in the grid;
(e) means for adjusting said expander control valve and thereby the flow of said first portion of gas through the first pipeline to the expander so that the generator frequency is acceptabley equal to the grid frequency; and,
(f) means for connecting the electrical power output of the generator to the grid.

4. The control system of claim 3 further characterized in that said means for controlling the pressure in the first pipeline by varying the flow of a second portion of the gas comprises a controller and a first bypass pipeline communicating with the first pipeline between the expander control valve and the second control valve and having a first bypass control valve located in the first bypass pipeline.

5. The control system of claim 4 further characterized in that said first bypass pipeline will pass a maximum of 25% of the gas flow which passes through the first pipeline.

6. The control system of claim 3 further characterized in that the control system comprises means for bypassing a third portion of gas from the process around the expander, upstream of the second control valve.

7. The control system of claim 6 further characterized in that said means for bypassing the third portion of gas comprises a controller and two expander bypass lines, with each expander bypass line having a control valve.

8. The control system of claim 7 further characterized in that said expander bypass pipelines will pass 110% of normal gas flow under normal operating conditions of the process, with the larger of the two pipelines passing 100% and the smaller of the two pipelines passing 10%.

9. The control system of claim 6 further characterized in that said means for bypassing the third portion of gas comprises the pressure control means of the process.

10. The control system of claim 3 further characterized in that said expander control valve will pass 90% of normal gas flow from the process.

11. In a system for recovering power by utilizing pressurized gas from a process, wherein a portion of the gas is employed to drive an expander which mechanically drives a generator, wherein the generator provides electrical power to a grid, wherein it is necessary to maintain constant the pressure at which the process operates; a control system useful in starting operation of the expander which comprises:
(a) an expander control valve located upstream of the expander in a first pipeline feeding a first portion of the gas to the expander;
(b) a first pressure control means comprising a first bypass pipeline having a control valve, said first bypass pipeline communicating with the first pipeline upstream of the expander control valve;
(c) a second control valve located in the first pipeline upstream of the point at which the first bypass pipeline is joined to the first pipeline; and,
(d) a second pressure control means comprising a controller and two expander bypass pipelines, with each expander bypass pipeline having a control valve and communicating with the first pipeline upstream of the second control valve.

12. The control system of claim 11 further characterized in that the second pressure control means controls the pressure at which the process operates.

13. The control system of claim 11 further characterized in that the expander control valve is operatively connected to receive a control signal from an electrical governor.

14. The control system of claim 13 further characterized in that the electrical governor is operatively connected to receive a control signal from a synchronizer.

15. The control system of claim 13 further characterized in that the electrical governor is operatively connected to receive a control signal from the second pressure control means.

16. The control system of claim 11 further characterized in that the control valve of the first bypass pipeline has a capacity of no more than 25% of the capacity of the expander control valve.

* * * * *